United States Patent [19]
Pohling

[11] Patent Number: 5,924,331
[45] Date of Patent: Jul. 20, 1999

[54] CABLE CONTROL SYSTEM HAVING STORED ENERGY FAIL-SAFE MECHANISM

[75] Inventor: John G. Pohling, Garden Grove, Calif.

[73] Assignee: McDonnell Douglas Corporation, Huntington Beach, Calif.

[21] Appl. No.: 08/889,250

[22] Filed: Jul. 8, 1997

[51] Int. Cl.[6] .............................. F16C 1/18; B64C 13/30
[52] U.S. Cl. ............................. 74/501.6; 74/96; 244/232
[58] Field of Search ........................... 74/500.5, 501.5 R, 74/502, 503, 504, 505, 506, 507; 244/232

[56] References Cited

U.S. PATENT DOCUMENTS

| | | | |
|---|---|---|---|
| Re. 23,933 | 2/1955 | Cushman | 74/521.5 |
| 2,810,300 | 10/1957 | Pigford | 74/501.5 |
| 2,934,971 | 5/1960 | Phelan | 74/501.5 |
| 2,992,568 | 7/1961 | Benkovsky et al. | 74/501.5 |
| 3,277,738 | 10/1966 | Glauser et al. | 74/501.5 |
| 3,599,507 | 8/1971 | Exton | 74/469 |
| 4,170,147 | 10/1979 | Durno et al. | 74/96 |
| 4,186,622 | 2/1980 | Cooper | 74/501 R |
| 4,198,877 | 4/1980 | Huling | 74/501 R |
| 4,529,155 | 7/1985 | Bramwell et al. | 244/232 |
| 4,540,141 | 9/1985 | Durno et al. | 244/17.19 |
| 4,776,543 | 10/1988 | Stableford | 244/232 |

FOREIGN PATENT DOCUMENTS 2 038 738  7/1980  United Kingdom ............ B64C 13/30

*Primary Examiner*—John A. Jeffery
*Assistant Examiner*—Katrina B. Harris
*Attorney, Agent, or Firm*—Senniger, Powers, Leavitt & Roedel

[57] ABSTRACT

A cable control system is constructed to isolate a controlled member from uncontrolled motion upon sudden breakage or disconnection of cables in the system. The control system has an input mechanism connected to the controlled member by a control circuit which includes an input pulley and an output pulley system. The output pulley system has first and second quadrants which are rotatable about a common axis of rotation. The quadrants have a pivot connection to permit relative pivoting motion between the quadrants. A spring connected between the quadrants urges them to rotate toward each other. The cables are connected to respective quadrants and to the input mechanism to cause conjoint rotation of the quadrants about the common axis in response to corresponding rotation of the input pulley. Tension in the cables holds the spring in an extended position. An output lever is pivotally mounted for free pivoting motion relative to the quadrants. A linkage interconnects the quadrants and the output lever in a control circuit operating position. However, should one of the cables break or become disconnected, the linkage is moved by operation of the spring to a control circuit isolating position in which the linkage is not able to transmit movement of the quadrants to the output lever whereby the controlled member is isolated from the effects of the breakage or disconnection.

15 Claims, 9 Drawing Sheets

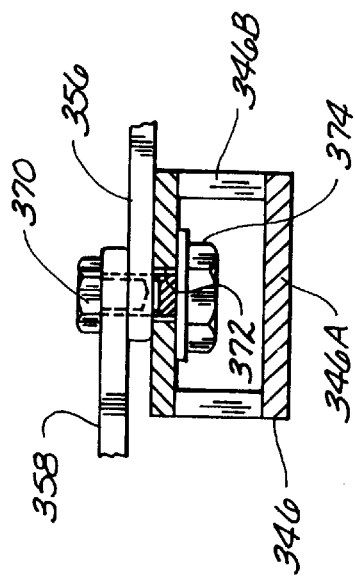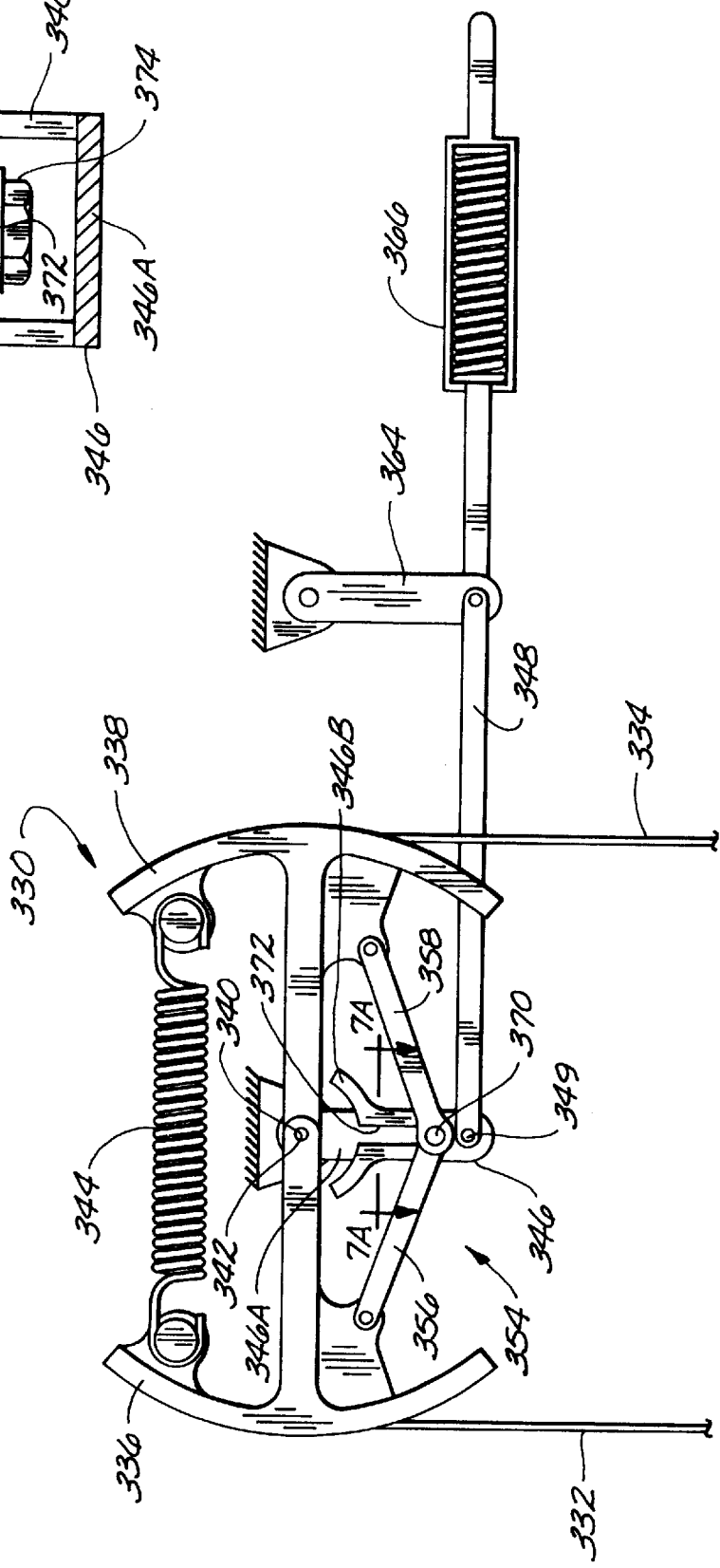

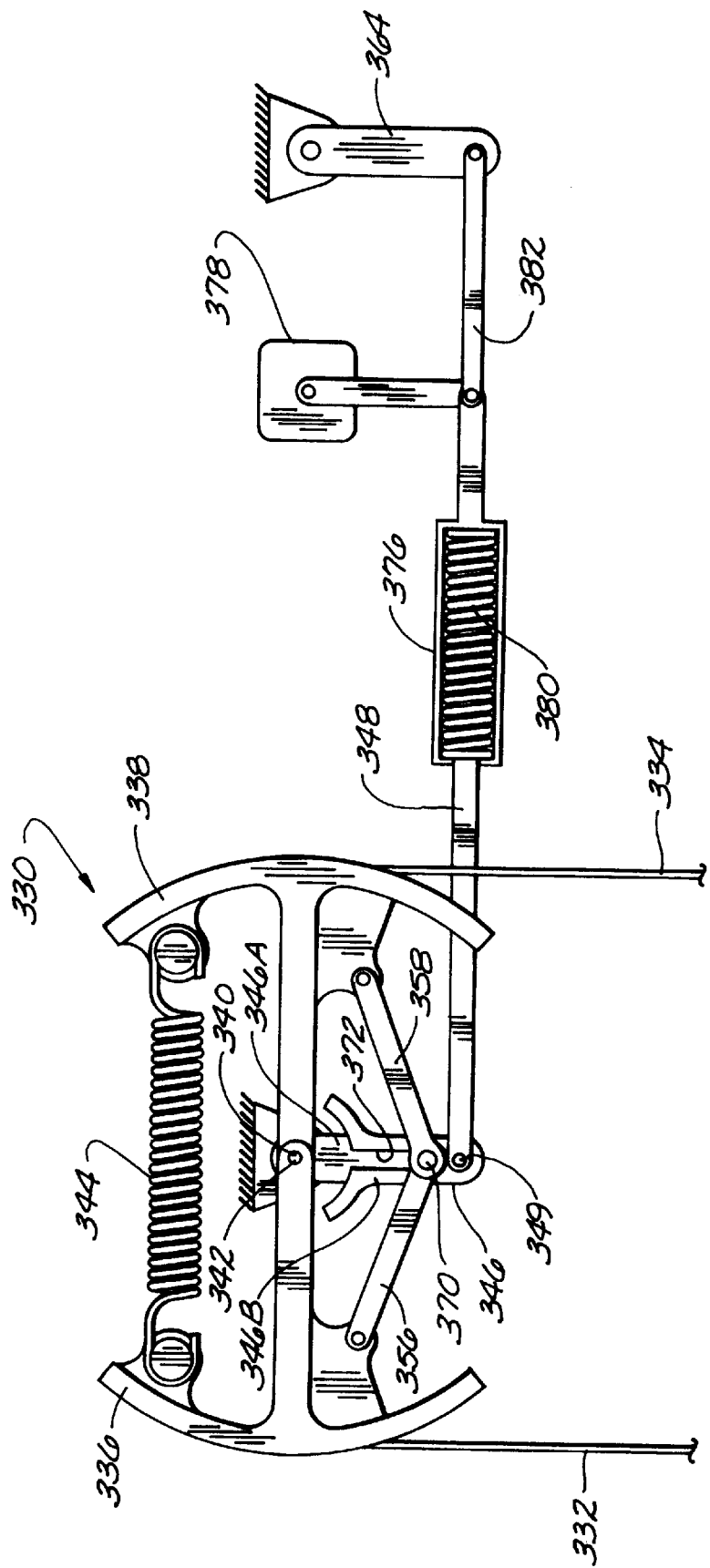

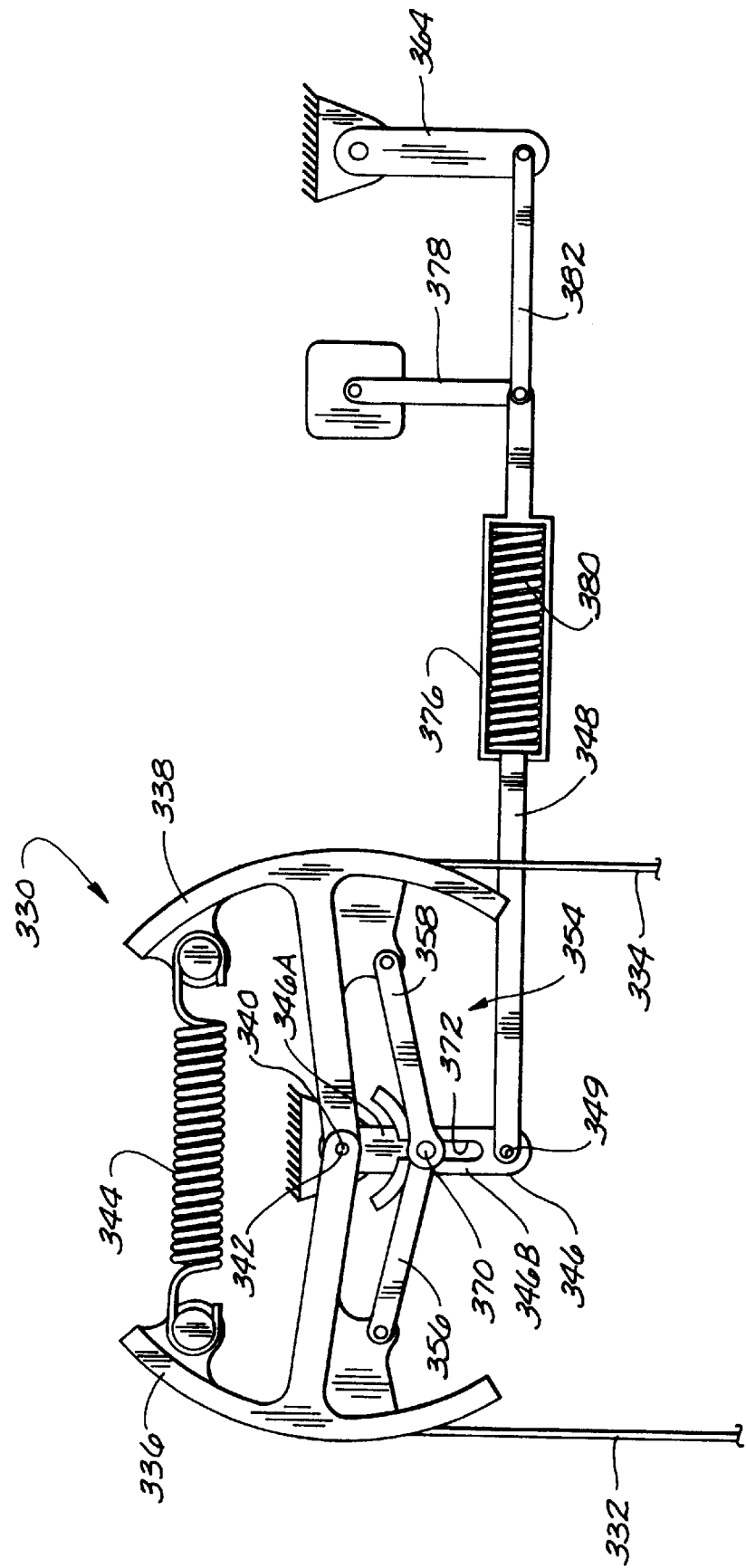

CABLE CONTROL SYSTEM HAVING STORED ENERGY FAIL-SAFE MECHANISM

BACKGROUND OF THE INVENTION

This invention relates generally to cable control systems, and more particularly, to such a system having a fail-safe mechanism to isolate a controlled member from the release of stored energy when a cable breaks or becomes disconnected.

Cables are often used to control flight control surfaces such as elevators, rudders or ailerons, or to control valves or other mechanisms in an airplane. Control equipment in other vehicles or various other types of machinery may also employ closed loop cable control systems. In a typical arrangement, each of two cables extend between an input pulley and an output pulley. Ends of the cables are connected on opposite sides of each pulley. The input pulley is connected to a lever which is connected by suitable linkage to an input mechanism, such as the steering column of an aircraft. Movement of the steering column results in rotation of the input pulley about its axis of rotation. The input pulley rotation is transmitted by the cables to the output pulley, causing a corresponding rotation. The rotary motion can be used directly to actuate a controlled member, or can be transmitted by a linkage connected to a lever on the output pulley.

In order for cable control systems to function properly, the cables must not be allowed to go slack. In the situation where these systems are used in aircraft, they are subjected to significant loads, load variations and thermal stresses in operation. As a result, there is a tendency for elongation or contraction of the cables as well as deformation of the structure supporting the cables. These changes can cause a loss of control function. To prevent the cables from going slack, the cables are rigged in the cable control system under a substantial load producing high tension in the cables. The tension in the cables allows the cable control system to remain operational despite elongation and contraction of the cables.

It is known that cables may break or otherwise become disconnected from the pulleys. When such failures occur substantially instantaneously, the energy which has been stored up as tension in the cables is violently released. The broken cable moves with great velocity and the unbroken cable recoils as its tension is relieved. A substantial force is imparted to the output pulley by the release of stored energy which can cause the pulley to pivot rapidly about its axis of rotation in an uncontrolled manner. Thus, the controlled member may be violently moved to some position.

There are cable control systems which are designed to permit retention of control when one of the cables breaks. Some use spring mechanisms to convert a dual cable control into a single cable control system. In the single cable control system, the spring urges the pulley to rotate in one direction and the remaining cable operates against the spring to produce rotation in the other direction. Other cable control systems disconnect the input pulley so that it can receive no input to transmit to the output pulley. In that event, there is a redundant control which takes over operation. However, these control systems do not isolate the output pulley and controlled member from forces created by the sudden release of the cable tension.

SUMMARY OF THE INVENTION

The present invention overcomes the deficiencies of the prior art by providing a cable control system which isolates the output from forces experienced when a cable suddenly breaks or becomes disconnected. The cable control system of the present invention rapidly and entirely disables the cables and output pulley from transmitting an output. Thus, the cable control system does not output uncontrolled motion to the control surface or other controlled member operated by the cable control system. As described above, systems are available to maintain cable control after breakage of a cable, or to transfer control to a secondary system. However, these systems still permit transfer of forces caused by release of stored energy in the cables upon breakage to the controlled member. In one embodiment, the cable control system is also capable of retaining control function even if the cables become loose. Further among the features of the present invention is the simplification in structure, reduction in cost and improvement in reliability.

Generally, a cable control system comprises a controlled member, an input mechanism, and a control circuit connecting the input mechanism and the controlled member for transmitting input to the controlled member for effecting movement of the controlled member. The control circuit comprises an input pulley system connected and responsive to the input mechanism, an output pulley system connected to the input pulley system and to the controlled member, and a pair of cables interconnecting the input and output pulley systems. The output pulley system comprises first and second quadrants rotatable about a common axis of rotation and having a pivot connection to allow for pivotal movement therebetween about a first pivot axis. A first cable of the pair of cables is connected at one end thereof to the first quadrant and a second cable of the pair is connected at one end thereof to the second quadrant. A spring mechanism interconnecting the first and second quadrants is configured to provide for conjoint rotation of the quadrants about the axis of rotation when the first and second cables are in tension and to provide for relative pivotal movement between the quadrants about the first pivot axis in the event of a cable breakage or disconnection. An output lever is pivotally connected at a first end thereof to the first and second quadrants for pivotal movement relative thereto about the first pivot axis, and is operatively connected at a second end thereof to the controlled member. Linkage is configured to assume a control-circuit operating position in which the linkage connects the first and second quadrants to the output lever whereby rotation of the quadrants in one direction causes the output lever to move the controlled member in a corresponding direction and rotation of the quadrants in an opposite direction causes the output lever to move the controlled member in a corresponding opposite direction. The arrangement is such that in the event there is relative pivotal movement between the first and second quadrants due to a cable break or disconnection, the linkage is movable from the control circuit operating position to a control circuit isolating position in which the linkage cannot transmit movement from the quadrants to the output lever, whereby the controlled member is isolated from the effects of the cable breakage or disconnection.

Other objects and features of the present invention will be in part apparent and in part pointed out hereinafter.

BRIEF DESCRIPTION OF THE DRAWINGS

FIG. 5A is an enlarged, fragmentary section taken in the plane including line 5A—5A of FIG. 5;

FIG. 7 is a schematic elevational view of an output pulley system of a third embodiment shown connected to a centering mechanism;

FIG. 7A is an enlarged, fragmentary section taken in the plane including line 7A—7A of FIG. 7;

FIG. 8 is the output pulley system of FIG. 7 connected to a vibration dampening system;

FIG. 9 is the output pulley system of FIG. 7 illustrating a slack cable condition in which the output pulley system may still function.

Corresponding reference characters indicate corresponding parts throughout the several views of the drawings.

DESCRIPTION OF THE PREFERRED EMBODIMENTS

Figure 1:
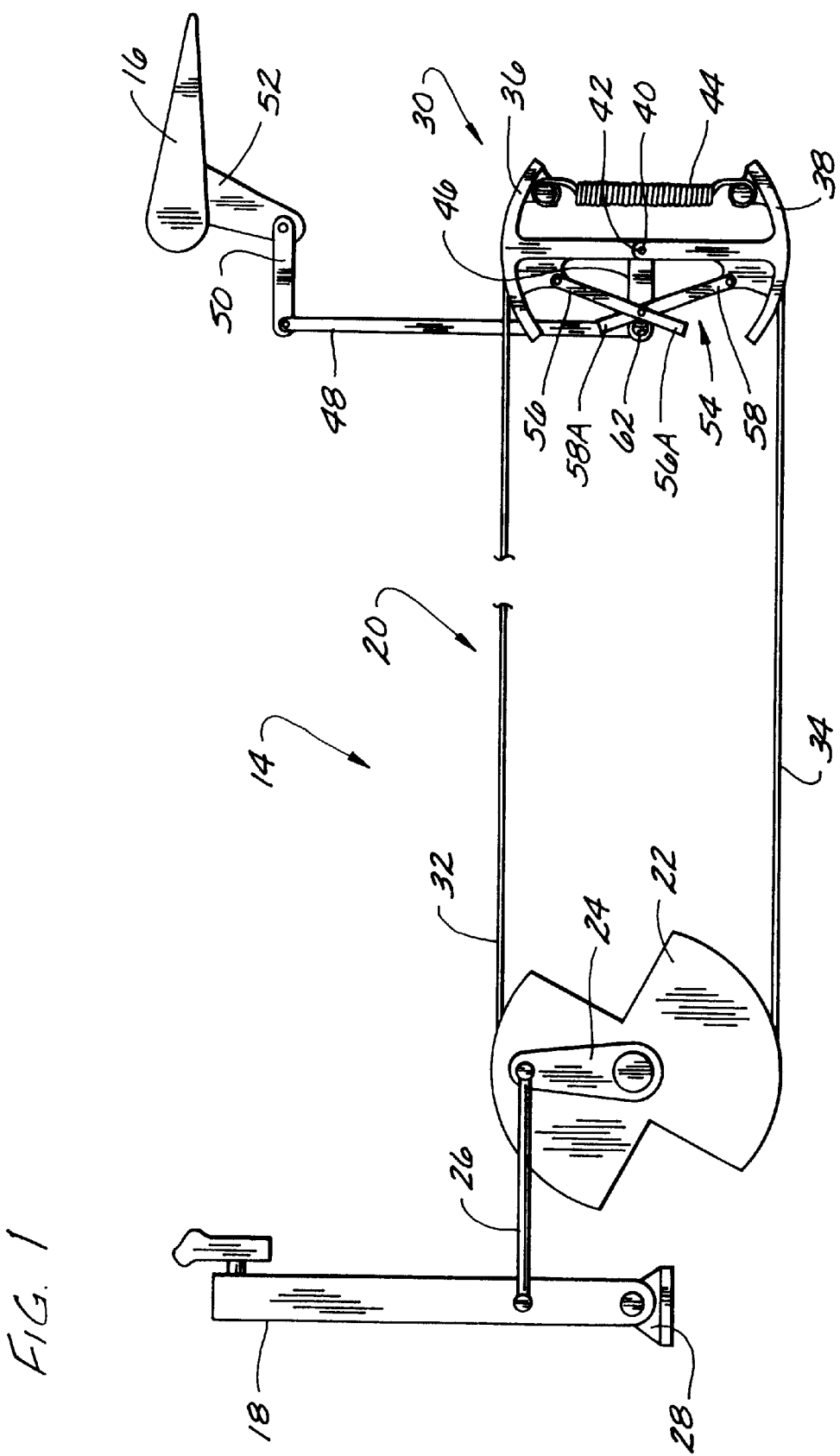
FIG. 1 is a schematic elevational view of a cable control system of the present invention.

Referring now to the drawings and in particular to FIG. 1, a cable control system constructed according to the principles of the present invention is indicated generally at 14. The control system includes a controlled member in the form of an elevator 16, for example, and an input mechanism which is illustrated in FIG. 1 as being a steering column 18 in an airplane (not shown). The input mechanism may also be a lever, switch or throttle, for example. A control circuit, generally indicated at 20, connects the steering column 18 to the elevator 16 for transmitting pilot input to the elevator. It is to be understood that a cable control system of the present invention may be used to control other control surfaces or other devices, such as valves in the aircraft. Moreover, the cable control system may be used other than in an aircraft without departing from the scope of the present invention.

The control circuit 20 comprises an input pulley 22 pivotally mounted on the frame of the airplane for pivoting about its central axis. The input pulley 22 is illustrated as a single solid structure having V-shaped sections cut away for weight reduction. Although a simplified structure for the input pulley is preferred, other more intricate constructions are envisioned. An input lever 24 is attached to the input pulley 22 for conjoint rotation with the pulley about the central axis. The free end of the input lever 24 is pivotally connected to an end of a first push-pull rod or first force transmitting member 26 which extends to the steering column 18 to which it is pivotally connected. In the illustrated embodiment, the input pulley 22, input lever 24 and first push-pull rod 26 constitute an "input pulley system".

The steering column 18 is pivotally connected to a mount 28 for forward and rearward pivoting motion. Forward pivoting of the steering column 18 (i.e., to the left as seen in FIG. 1), is transmitted by the first push-pull rod 26 to the input lever 24 to cause corresponding counterclockwise rotation of the input pulley 22. Rearward pivoting of the steering column 18 pushes the input lever 24 to the right, causing a clockwise pivoting motion of the input pulley 22. The first push-pull rod 26 is representative of any linkage including any number of components which might be used to connect the steering column 18 to the input pulley 22.

The input pulley 22 is connected to an output pulley system, indicated generally at 30, by a pair of cables (designated 32 and 34, respectively). The output pulley system 30 of a first embodiment shown in FIGS. 1–4 includes a first quadrant 36 and a second quadrant 38 mounted on the frame of the airplane for rotation about a common axis of rotation 40. The common axis of rotation 40 is the axis about which the output pulley system 30 rotates in response to the input from the input pulley 22 in normal operation. The quadrants 36, 38 are pivotally connected to each other for rotation about a first axis 42 to allow for relative pivotal motion between the quadrants about the first axis. In the first embodiment, the first pivot axis 42 coincides with the common axis of rotation 40 of the quadrants 36, 38.

A first of the cables 32 is connected at one end to the upper side of the input pulley 22 (as viewed in FIG. 1) and also to the first quadrant 36 of the output pulley system 30 at an opposite end of the cable. A second of the cables 34 is connected at one end to the lower side of the input pulley 22 and at its opposite end to the second quadrant 38 of the output pulley system 30. The quadrants 36, 38 of the output pulley system are connected to each other by a spring 44 (broadly, "spring mechanism") which urges the quadrants to rotate toward each other about the first axis 42. However, the tension of the cables attached to the quadrants 36, 38 urges the quadrants to rotate in the opposite direction about the first axis 42 against the force of the spring 44. The cable tension is such that the quadrants 36, 38 are held in a substantially fixed angular position relative to each other with the spring 44 extended from its relaxed position. In normal operation, the quadrants 36, 38 pivot conjointly about the common axis of rotation 40. Thus, it may be seen that pivoting of the input pulley 22 about its central axis will result in pivoting of the first and second quadrants 36, 38 about the common axis of rotation 40 in the same direction as the input pulley.

An output lever 46 is pivotally connected at a first end for pivoting about the first axis 42. The output lever 46 is free of fixed connection to the first and second quadrants 36, 38 so that it is possible, as discussed more fully below, when one of the cables 32, 34 breaks or becomes disconnected, for relative pivoting motion about the first axis 42 between the output lever and either or both of the quadrants. Connection of a second end of the output lever 46 to the elevator 16 is accomplished by a second push-pull rod or second force transmitting member 48 which is connected to the output lever for pivoting about a second pivot axis. The second push-pull rod 48 is pivotally connected at an end opposite the output lever 46 to a link 50. The link is attached to a crank 52 which is attached for conjoint movement with the elevator 16. The connection of the output lever 46 to the elevator 16 is shown diagrammatically in FIG. 1, it being understood that the precise linkage used to interconnect the output lever and the controlled member (e.g., elevator 16) may be other than shown without departing from the scope of the present invention.

A linkage, generally indicated at 54, is configured to assume a control-circuit operating position in which the linkage connects the first and second quadrants 36, 38 to the output lever 46. Pivoting of the first and second quadrants 36, 38 about the common axis 40 in a clockwise direction (as viewed in FIG. 1) pivots the output lever 46 about the common axis, pushing the second push-pull rod 48 and pivoting the elevator 16 in a clockwise direction to swing the trailing edge of the elevator downward. Counterclockwise pivoting of the first and second quadrants 36, 38 causes the second push-pull rod 48 to be pulled in the opposite direction. The elevator 16 is pivoted in a counterclockwise direction which moves the trailing edge of the elevator upward. The arrangement of the linkage 54, first and second quadrants 36, 38 and output lever 46 is such that in the event their is a relative pivotal movement between the first and second quadrants caused by breakage or disconnection of one of the cables 32, 34, the linkage moves from the control circuit operating position (FIGS. 1 and 2) to a control circuit isolating position (FIG. 3). The linkage 54 cannot transmit movement from the first and second quadrants 36, 38 to the output lever 46 or second push-pull rod 48 in the control circuit isolating position. Therefore, the second push-pull rod 48 and the elevator 16 are isolated from the effects of the cable breakage or disconnection.

Figure 2:
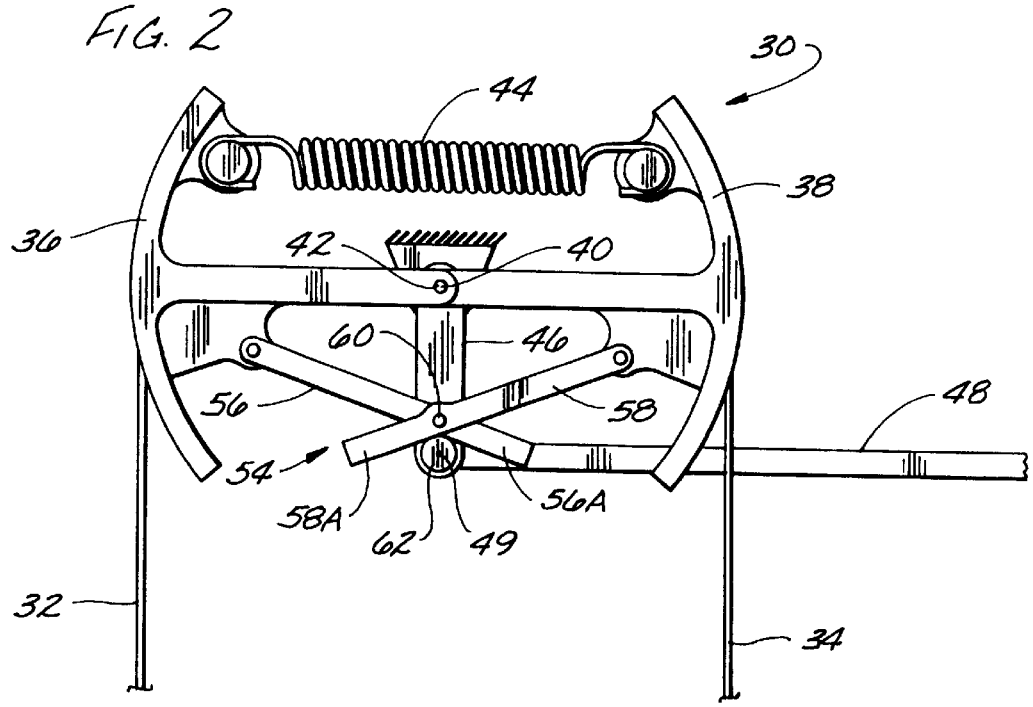
FIG. 2 is an enlarged fragmentary view of the cable control system of FIG. 1 showing a first embodiment of an output pulley system of the control system.
Figure 3:
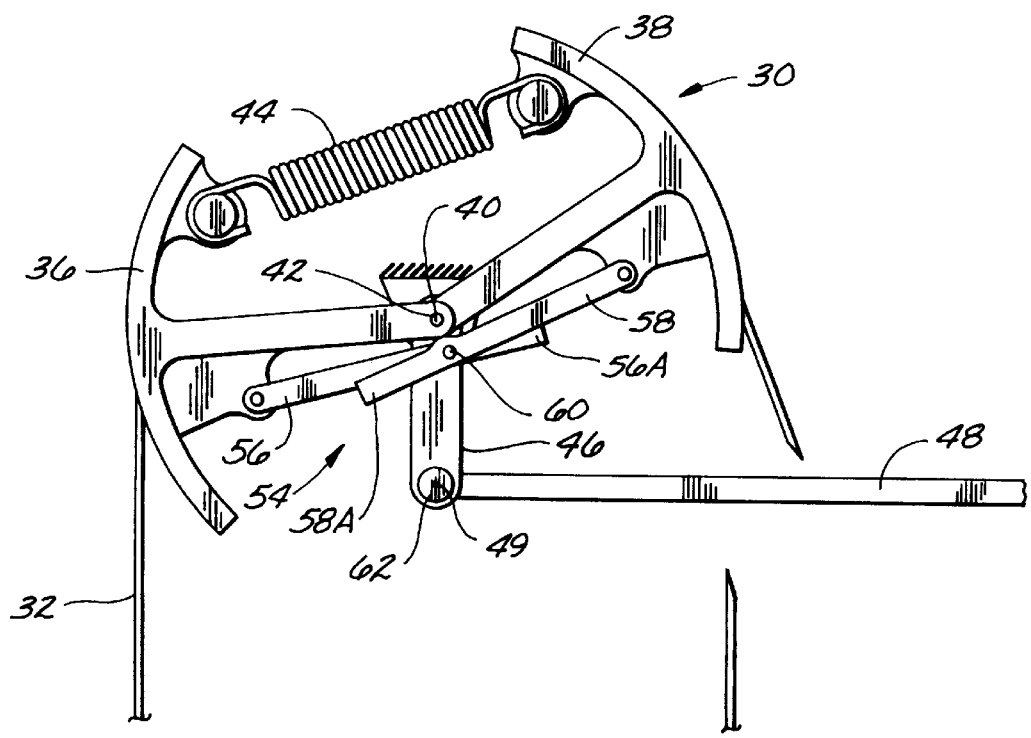
FIG. 3 is the output pulley system of FIG. 2 in the configuration after one of two cables attached to the output pulley system breaks.

In the first embodiment, the linkage 54 comprises a first arm 56 pivotally connected to the first quadrant 36 at one end and extending outwardly from the first quadrant to the output lever 46 (FIG. 2). A second arm 58 is pivotally connected to the second quadrant 38 and extends outwardly from the second quadrant to the output lever 46 where there is a pivot connection 60 of the second arm to the first arm 56. The location of the pivot connection 60 of the arms 56, 58 is spaced in a first direction from the first pivot axis 42 when the linkage 54 is in its control circuit operating position, but moves toward the first pivot axis as the linkage moves to its control circuit isolating position.

The first and second arms 56, 58 are configured in a scissors arrangement, with outer ends of the arms (designated by 56A and 58A, respectively) projecting beyond the pivot connection 60 between the arms. The projecting outer ends 56A, 58A of the arms receive a post 62 rigidly connected to the output lever 46. The arms 56, 58 are free of fixed connection to the post 62, but they capture the post between the outer ends 56A, 58A so that the post and output lever 46 are constrained to move with the linkage 54 and the first and second quadrants 36, 38. Thus, in the control circuit operating position, pivoting of the first and second quadrants 36, 38 about the common axis of rotation 40 produces conjoint pivoting of the output lever 46 about the common axis of rotation.

The linkage 54 quickly releases the output lever 46 when one of the cables 32, 34 breaks. In the example shown in FIG. 3, cable 34 has broken, releasing the tension force applied to the second quadrant 38 and permitting the spring 44 to rotate the second quadrant in a counterclockwise direction to a position closer to the first quadrant 36. The second arm 58 is carried along with the second quadrant 38 as it pivots about the first axis 42 under the spring force. As a result, the distance between the locations where the first and second arms 56, 58 are connected to the first and second quadrants 36, 38, respectively, is increased. To accommodate the increase, the arms 56, 58 pivot about their pivot connection 60 to a less angled relative orientation which separates the outer ends 56A, 58A of the arms and causes the pivot connection to be moved toward the first pivot axis 42 away from the post 62, thereby disengaging the output lever 46.

Figure 4:
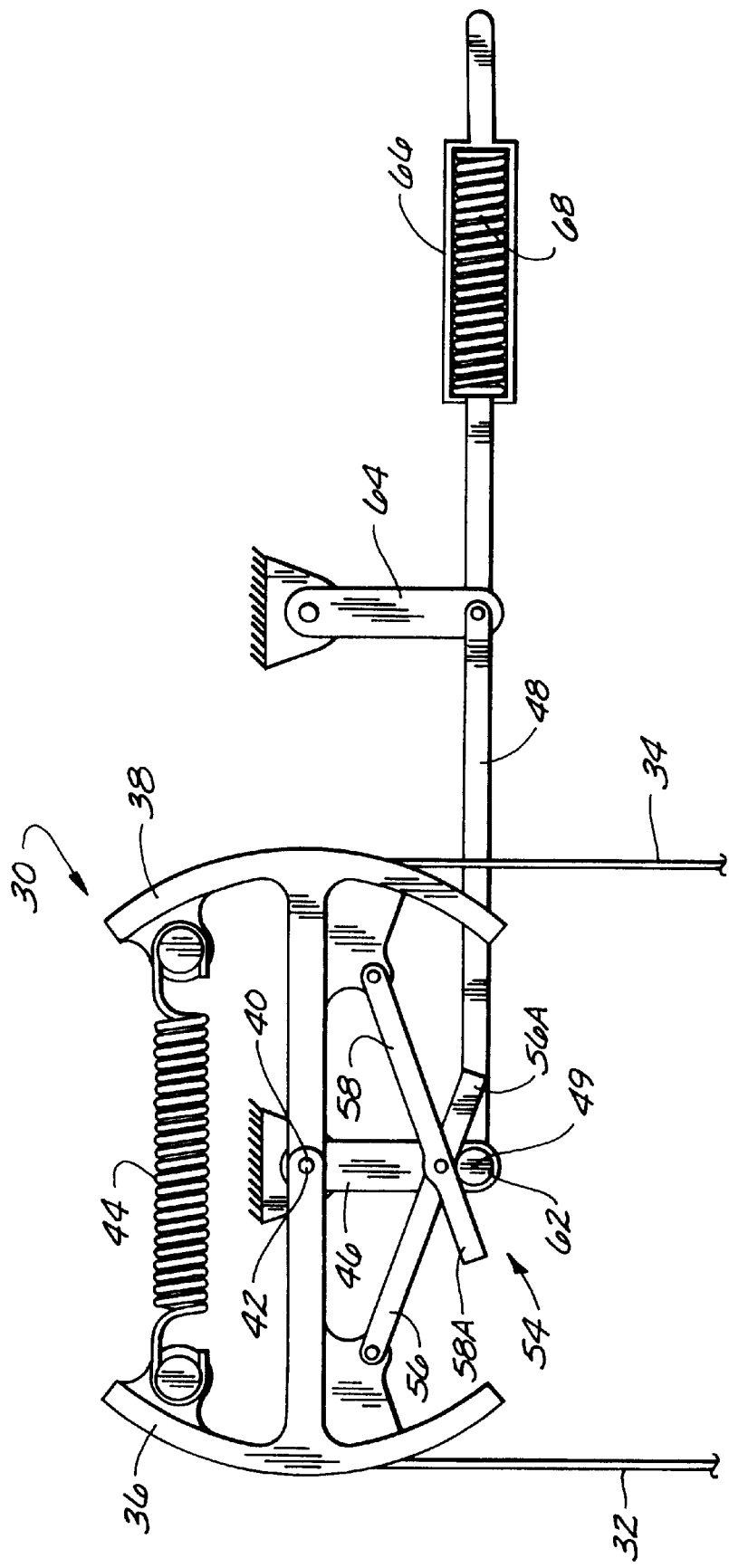
FIG. 4 is the output pulley system of FIGS. 2 and 3, shown connected to a centering mechanism.

In the circuit isolating position of the linkage 54, violent motion of the first and second quadrants 36, 38 about the common axis of rotation 40 caused by the release of tension in the broken cable 34 and relaxation of the unbroken cable 32 cannot be transmitted to the output lever 46. The output lever, push-pull rod 48 and elevator 16 are immediately isolated from the cable control circuit 20. In the configuration shown in FIGS. 1–3 of the first embodiment of the output pulley system 30, the elevator 16 will be left in the last commanded position prior to breakage of the cable 34. FIG. 4 illustrates a configuration in which the controlled member (lever 64) is returned to a predetermined or neutral position if one of the cables 32, 34 breaks or is disconnected. The second push-pull rod 48 is pivotally connected to a lever 64 which might operate a valve or other mechanism (not shown). A spring box 66 is connected to the lever 64 on the opposite side of the lever from the output pulley system 30. A spring 68 of the spring box 66 biases the lever 64 toward the neutral position in which the spring is relaxed. Movement of the lever 64 in either direction from the neutral position causes a spring force to be applied to the lever urging it back toward the neutral position. In normal operation, the output pulley system 30 is capable of operating against the bias of the spring 68 to move the lever 64 to the desired position.

Figure 5:
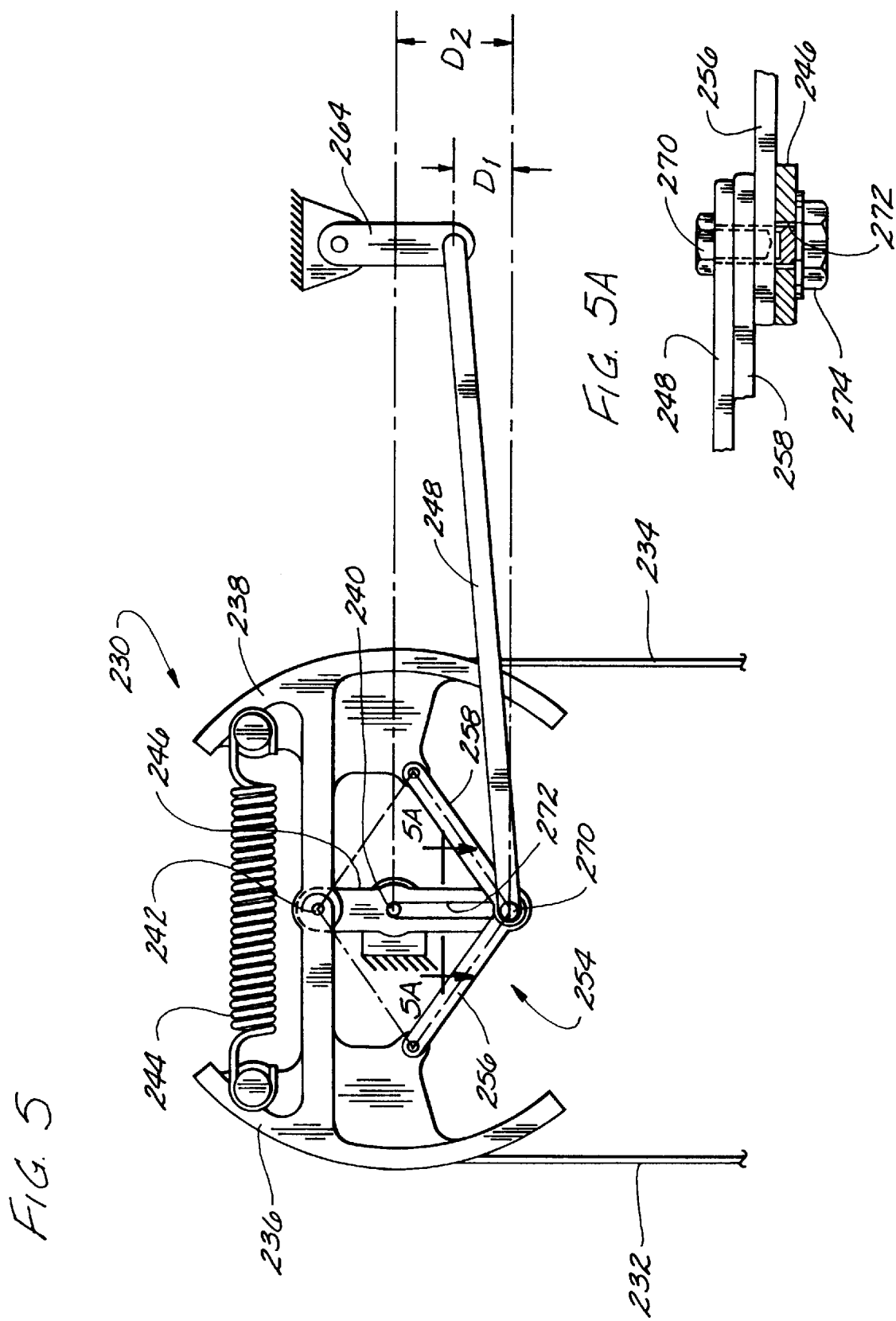
FIG. 5 is a schematic elevational view of an output pulley system of a second embodiment.
Figure 6:
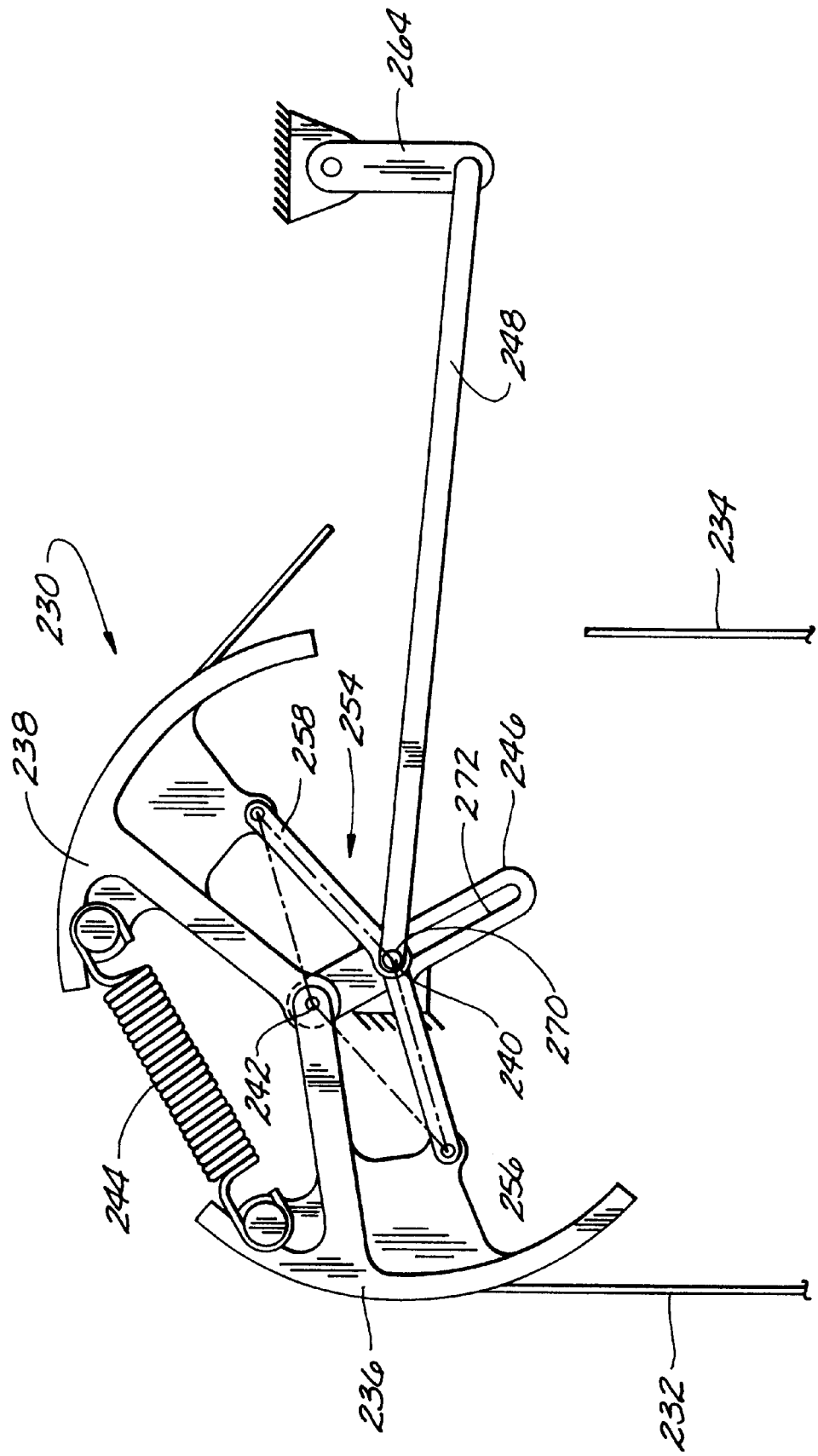
FIG. 6 is the output pulley system of FIG. 5 in the configuration after one of two cables attached to the output pulley breaks.

Referring now to FIGS. 5 and 6 of the drawings, an output pulley system of a second embodiment is indicated generally at 230. As explained more fully hereinafter, the output pulley system of the second embodiment is constructed to move the controlled member (diagrammatically shown as a lever 264 in FIG. 5) to a neutral or other predetermined position upon breakage or disconnection of one of the cables 232, 234. Movement to the neutral position is accomplished without the need for a second spring, such as the spring box 66 used in the first embodiment. Corresponding components of the output pulley system 230 of the second embodiment will be indicated by the same reference numerals as for the output pulley system 30 of the first embodiment with the addition of the prefix "2".

First and second quadrants 236, 238 of the output pulley system 230 are pivotally connected to each other about a first axis 242 which is spaced from a common axis of rotation 240 about which the quadrants are rotatable in control circuit operation. An output lever 246 of the second embodiment is mounted for rotation about the common axis of rotation 240, and extends in opposite directions from the common axis. The first and second quadrants 236, 238 are pivotally connected to the output lever 246 at a first end of the output lever on one side of the common axis 240 at the same location where the quadrants are pivotally connected to each other. A spring 244 urges the quadrants 236, 238 to rotate toward each other about the first axis 242. However, the tension in the cables 232, 234 applies a load to the first and second quadrants 236, 238 tending to rotate the quadrants in the opposite direction about the first axis 242 and extends the spring 244 as in the first embodiment.

Linkage 254 of the second embodiment includes first and second arms 256, 258, the first being pivotally connected at one end to the first quadrant 236 and the second being pivotally connected at one end to the second quadrant 238. Second ends of the arms 256, 258 are pivotally connected to each other by a pivot pin 270 which is also received through a slot 272 in the output lever 246 (see FIG. 5A). The pivot pin 270 also pivotally connects an end of second push-pull rod 248. The slot 272 extends in a first direction from the common axis of rotation 240 substantially to the second end of the output lever 246 (FIG. 5). The pivot pin 270 is secured in the slot 272 by a suitable fastener 274, but is permitted to slide longitudinally of the output lever 246 in the slot (FIG. 5A).

As shown in FIG. 6, breakage of cable 234 allows the spring 244 to pivot the second quadrant 238 in a counterclockwise direction toward the first quadrant 236. The first end of the second arm 258 connected to the second quadrant 238 is moved along with the second quadrant. The movement of the second arm 258 causes the pivot pin 270 to slide toward the first axis 242 in the slot 272 to the common axis of rotation 240. The end of the second push-pull rod 248 is simultaneously moved to the common axis 240. Phantom lines in FIGS. 5 and 6 illustrate that the pivot pin 270, pivot connections of the first and second arms 256, 258 to the respective quadrants 236, 238, and pivot connection of the quadrants and output lever 246 at the first axis 242 define a parallelogram which is collapsed by the pivoting of the second quadrant to produce the desired movement of the pivot pin and push-pull rod 248.

Although breakage of cable 234 does not result in release of the output lever 246, the coincidence of the pivot pin 270 with the common axis of rotation 240 of the first and second quadrants 236, 238 does not permit any forces to be applied to second push-pull rod 248. Rotation of the quadrants 236, 238 about the common axis 240 will no longer result in the linkage delivering torque via the output lever 246 to the second push-pull rod 248. Therefore, the same isolation of the control circuit 230 from the output (lever 264) is achieved. In addition, the movement of the pivot pin 270 to the common axis 240 causes the lever 264 to be moved to a neutral or other predetermined position. In order to accomplish movement to the neutral position, the orthogonal distance D1 between a first horizontal plane passing through the pivot pin 270 when located at the end of the slot 272 opposite the common axis of rotation 240 and a second horizontal plane passing through the pivot connection of the second push-pull rod 248 with the lever 264 is one half the orthogonal distance D2 between the first horizontal plane and a third horizontal plane passing through the common axis of rotation 240 (FIG. 5). Predetermined positions other than neutral may be obtained by changing the ratio of D1 to D2.

An output pulley system of a third embodiment shown in FIGS. 7–10 is generally indicated at 330. As discussed more fully hereinafter, the output pulley system of the third embodiment is particularly constructed to take up slack in cables 332, 334 for permitting continued control of a controlled member (lever 364) through second push-pull rod 348. Corresponding components of the third embodiment will be designated by the same reference numerals as for the output pulley system of the first embodiment, but with the prefix "3". As in the first embodiment, first and second quadrants 336, 338 are pivotally connected to each other for pivoting about a first axis 342 which coincides with a common axis of rotation 340 of the quadrants. Spring 344 biases the quadrants 336, 338 to rotate toward each other about the first axis 342, but in normal operation the tension of the cables 332, 334 holds the quadrants apart so that the spring is extended from its relaxed position.

The output lever 346 is pivotally connected at one end to the first and second quadrants 336, 338 for pivoting about the first axis 342. The output lever 346 extends in the first direction from the first axis 342 and is pivotally connected to the second push-pull rod 348 at a second end of the output lever for relative pivotal movement about a second pivot axis 349. In the third embodiment, the output lever 346 includes a base lever 346A and a slot bracket 346B rigidly connected to the base lever (see FIG. 7A). The slot bracket 346B has a slot 372 spaced away from the base lever 346A and extending from adjacent the second end of the output lever 346 toward the first axis 342 (FIG. 7). The slot 372 is closed near the second end of the output lever 346, but is open at its end nearer the first axis 342. The slot 372 is generally Y-shaped in appearance.

Figure 10:
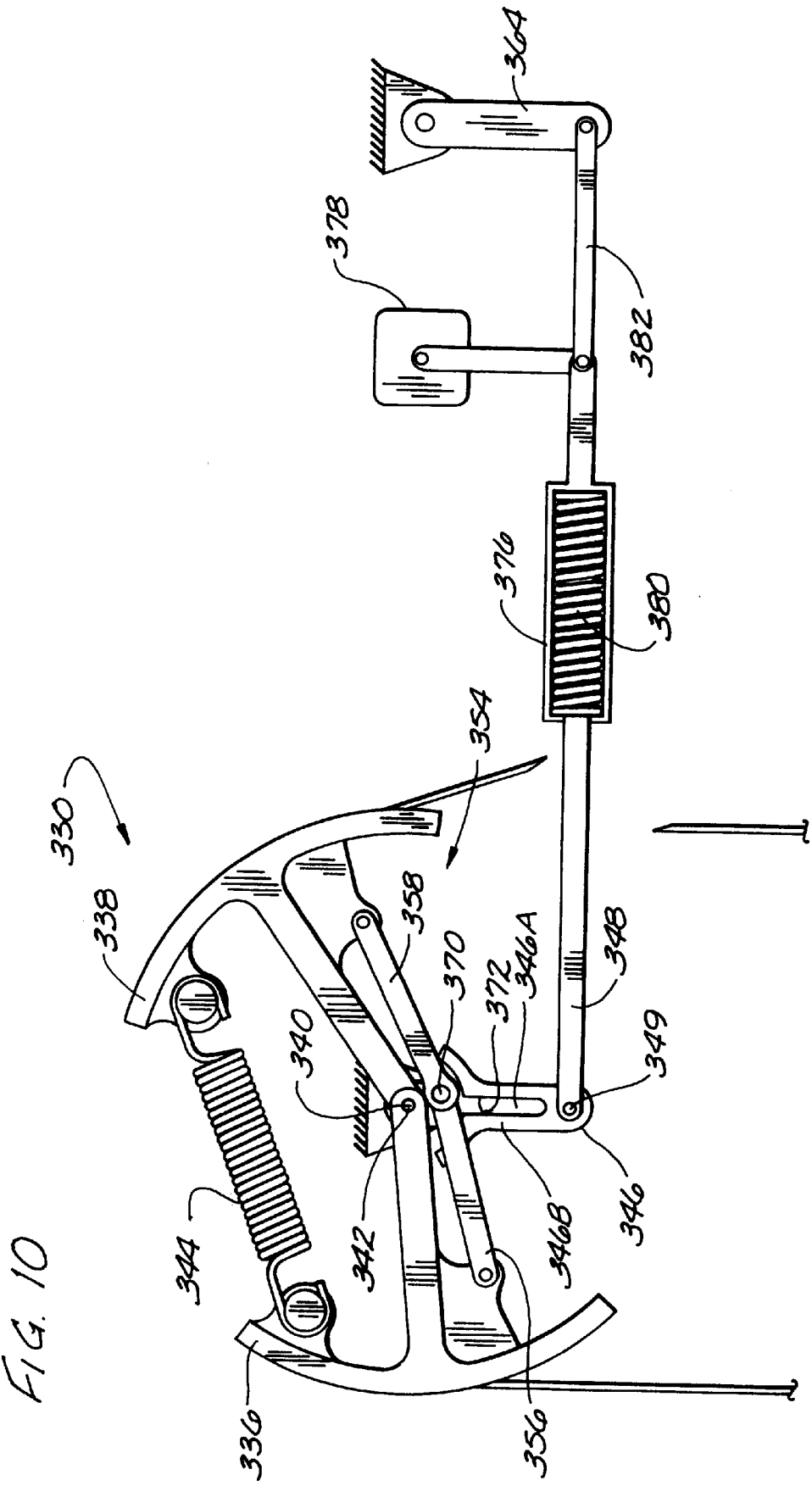
FIG. 10 is the output pulley system as shown in FIG. 9 but illustrating its position after breakage of one of two cables connected to the output pulley system.

First and second arms 356, 358 of the linkage 354 are pivotally connected to each other by a pivot pin 370 which is received in the slot 372 and prevented from moving in a direction perpendicular to the plane of the base lever 346A out of the slot by a suitable fastener 374 (FIGS. 7 and 7A). The pivot pin 370 is capable of sliding longitudinally of the output lever 346 in the slot 372 from the second end of the output lever toward the first axis 342. Should cable 334 break, as shown in FIG. 10, the second quadrant 338 is pivoted counterclockwise by the spring 344 about the first axis 342 to a position closer to the first quadrant 336. The second arm 358 moves along with the second quadrant 338, causing the pivot pin 370 to slide toward the first axis 342 in the slot 372 and to move entirely out of the slot through its open end. In the control circuit isolating position, the linkage 354 completely disconnects from the output lever 346. The linkage 354 is no longer capable of transmitting an output force to the output lever 346 so that the control circuit 330 is isolated from the lever 364.

In FIG. 7, a spring box 366 is provided on the opposite side of the lever 364 from the second push-pull rod 348 to bias the lever toward a predetermined neutral position. The operation of the spring box 366 is exactly as described above in reference to FIG. 4 of the first embodiment. The output pulley system 330 of the third embodiment is illustrated in FIGS. 8-10 in combination with a spring box 376 and dampener 378 to prevent communication of any shock force to the lever 364 as the pivot pin 370 exits the slot 372. The second push-pull rod 348 terminates in the spring box 376 where it is connected to spring 380. A bar 382 extends from the spring box 376 and is pivotally connected to the lever 364. Thus, the spring box 376 is capable of absorbing shock forces applied to the second push-pull rod 348. The vibration dampener 378 is pivotally connected to the bar 382 extending from the spring box 376 to dampen oscillatory motions of the bar.

As shown in FIG. 9, the output pulley system 330 of the third embodiment is capable of continued operation even though the cables 332, 334 suffer a loss of tension, such as by elongation of the cables. A reduction in the tension in the cables 332, 334 will permit the spring 344 to pivot the first and second quadrants 336, 338 toward each other a distance less than the quadrants will pivot should one of the cables break or become disconnected, until a new equilibrium is established. The movement of the quadrants 336, 338 takes up slack in the cables 332, 334 so that the control circuit 20 is still capable of transmitting an output to the lever 364. The first and second arms 356, 358 move so that the pivot pin 370 is closer to the first axis 342, but still remains in the slot 372 so that the linkage 354 continues to connect the quadrants 336, 338 to the output lever 364 in force transmitting relationship. It is envisioned that in the second embodiment (FIGS. 5 and 6) retention of limited control, should the cables 232, 234 go slack, could also be accomplished. The push-pull rod 248 continues to be able to receive a force from the quadrants 236, 238 until the pivot pin 270 reaches the common axis of rotation 240. Thus although the lever arm would be shortened, requiring additional motion to move the push-pull rod 248, the quadrants 236, 238 and arms 256, 258 remain capable of transmitting the force to the push-pull rod 248.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cable control system comprising a controlled member, an input mechanism, and a control circuit connecting the input mechanism and the controlled member for transmitting input to said controlled member for effecting movement of the controlled member, said control circuit comprising an input pulley system connected and responsive to the input mechanism, an output pulley system connected to the input pulley system and to the controlled member, and a pair of cables interconnecting said input and output pulley systems, said output pulley system comprising:

first and second quadrants rotatable about a common axis of rotation, said quadrants having a pivot connection to allow for pivotal movement therebetween about a first pivot axis;

a first cable of said pair of cables being connected at one end thereof to the first quadrant and a second cable of the pair being connected at one end thereof to the second quadrant;

a spring mechanism interconnecting the first and second quadrants, said spring mechanism being configured to provide for conjoint rotation of the quadrants about said axis of rotation when the first and second cables are in tension and to provide for relative pivotal movement between the quadrants about said first pivot axis in the event of a cable breakage or disconnection;

an output lever pivotally connected at a first end thereof for pivotal movement about said first pivot axis relative to said first and second quadrants and operatively connected at a second end thereof to said controlled member;

a linkage configured to assume a control-circuit operating position in which the linkage connects the first and second quadrants to the output lever whereby rotation of the quadrants in one direction causes the output lever to move the controlled member in a corresponding direction and rotation of the quadrants in an opposite direction causes the output lever to move the controlled member in a corresponding opposite direction;

the arrangement being such that in the event there is relative pivotal movement between the first and second quadrants due to a cable break or disconnection said linkage is adapted to be moved from said control circuit operating position to a control circuit isolating position in which the linkage cannot transmit movement from the quadrants to said output lever whereby the controlled member is isolated from the effects of said cable breakage or disconnection;

a force transmitting member connected to the controlled member and pivotally connected to a second end of the output lever for pivotal movement relative thereto about a second pivot axis spaced from said first pivot axis of the output lever in a first direction, and wherein said linkage comprises a first arm having a pivot connection with the first quadrant and extending outwardly therefrom to said output lever, a second arm having a pivot connection with the second quadrant and extending outwardly therefrom to said output lever, and a pivot connection between the first and second arms at a location adjacent the output lever, said pivot connection being spaced in said first direction from said first pivot axis when the linkage is in its said control circuit operating position and adapted to moved toward said first pivot axis as the linkage moves toward its said control circuit isolating position.

2. A cable control system as set forth in claim 1 wherein said first and second arms are configured in a scissors arrangement and have outer ends engageable with said output lever, said outer ends being movable out of engagement with said output lever as the linkage moves toward its said control circuit isolating position.

3. A cable control system as set forth in claim 2 wherein the axis of rotation of the two quadrants is coincident with said first pivot axis.

4. A cable control system as set forth in claim 1 wherein said output lever has a slot therein extending in said first direction, and wherein said pivot connection between said first and second arms comprises a pivot pin received in said slot, said pivot pin being movable in the slot toward said first axis as the linkage moves toward its said control circuit isolating position.

5. A cable control system as set forth in claim 4 wherein said pivot pin assumes a position generally corresponding to said common axis of rotation of the first and second quadrants when the linkage is in said control circuit isolating position.

6. A cable control system as set forth in claim 5 wherein the force transmitting member is connected to said pivot pin for pivotal movement about said second pivot axis.

7. A cable control system as set forth in claim 6 wherein said common axis of rotation is spaced in said first direction from said first pivot axis.

8. A cable control system as set forth in claim 4 wherein the force transmitting member is pivotally connected to said output lever at a fixed location spaced from the slot in said first direction.

9. A cable control system as set forth in claim 8 wherein said pivot pin is movable out of the slot as the linkage moves toward its control circuit isolating position whereby the arms cannot transmit movement from the quadrants to the output lever.

10. A cable control system as set forth in claim 1 wherein the linkage is operable to transmit rotational movement from the quadrants to said output lever over a limited range of relative pivotal movement between the quadrants to allow for the take-up of slack in the cables.

11. A cable control system as set forth in claim 10 wherein the linkage comprises first and second arms pivotally connected to said first and second quadrants, respectively, said arms extending from respective quadrants toward said output lever and having a pivot connection therebetween adjacent said output lever to form a scissors arrangement in which said arms are engageable with said output lever.

12. A cable control system as set forth in claim 10 wherein said output lever has a slot therein extending in said first direction, and wherein the linkage comprises first and second arms pivotally connected to said first and second quadrants, respectively, said arms extending from respective quadrants toward said output lever and having a pivot connection therebetween comprising a pivot pin received in said slot, said pivot pin being movable in the slot toward said first axis as the linkage moves toward its said control circuit isolating position.

13. A cable control system as set forth in claim 1 wherein said spring mechanism comprises a single spring connecting the first and second quadrants.

14. A cable control system as set forth in claim 1 further comprising a force transmitting and means for dampening movement of the force transmitting member in the event of a cable break or disconnection.

15. A cable control system as set forth in claim 1 further comprising means operable on the controlled member for moving the control member to a predetermined position upon movement of the linkage to said control circuit isolating position.

\* \* \* \* \*

UNITED STATES PATENT AND TRADEMARK OFFICE
CERTIFICATE OF CORRECTION

PATENT NO : 5,924,331
DATED : July 20, 1999
INVENTOR(S): John G. Pohling

It is certified that error appears in the above-identified patent and that said Letters Patent is hereby corrected as shown below:

Column 10, claim 14, line 58, "comprising a force transmitting and means" should read ---comprising means---.

Signed and Sealed this

Twenty-third Day of May, 2000

Attest:

Q. TODD DICKINSON

*Attesting Officer*   *Director of Patents and Trademarks*